Dec. 22, 1959   B. HOWARD   2,918,528
SELECTOR FOR TELEGRAPH PRINTER
Filed April 11, 1957   3 Sheets-Sheet 1

INVENTOR
BERNARD HOWARD
BY
ATTORNEYS

Dec. 22, 1959   B. HOWARD   2,918,528
SELECTOR FOR TELEGRAPH PRINTER
Filed April 11, 1957   3 Sheets-Sheet 2
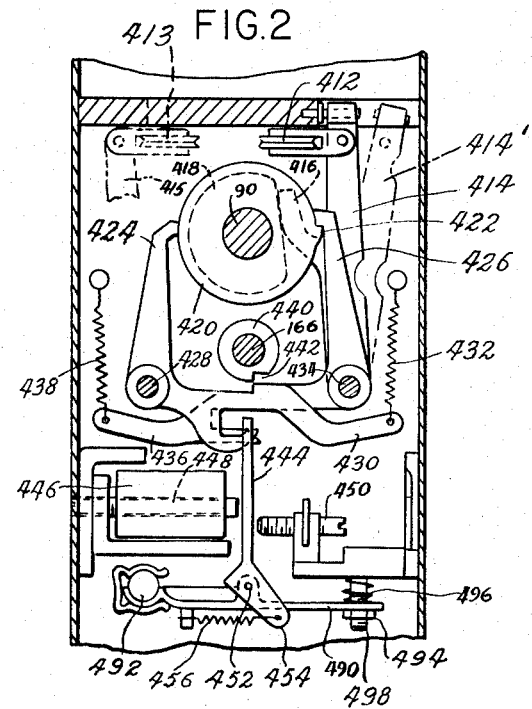
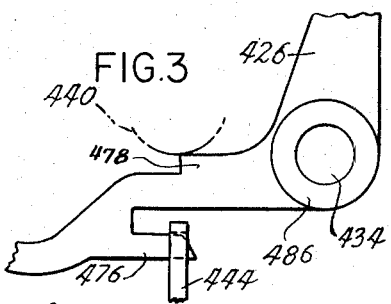
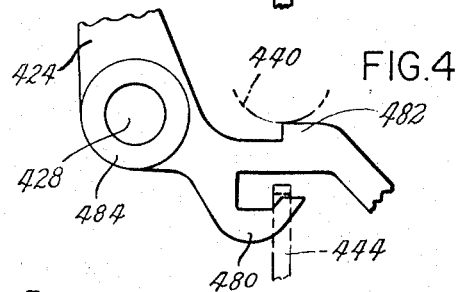
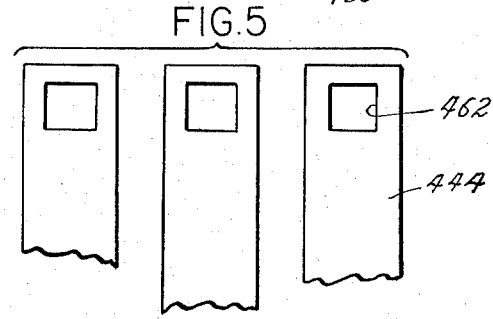
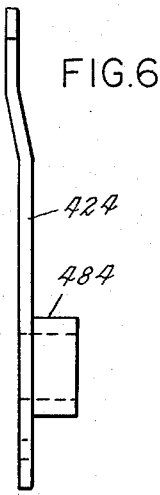
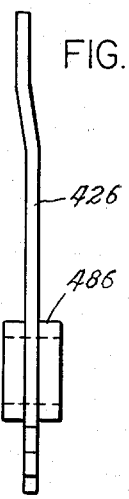
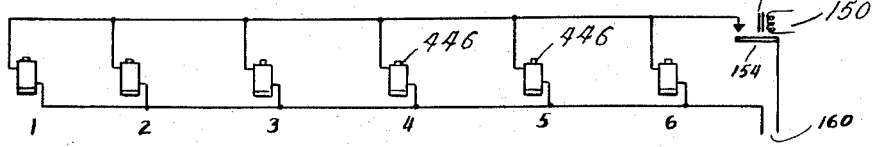
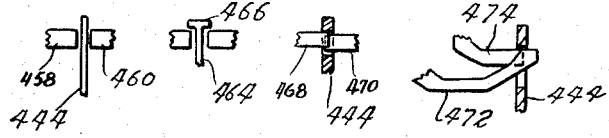
INVENTOR.
BERNARD HOWARD
BY James and Franklin
ATTORNEYS Dec. 22, 1959  B. HOWARD  2,918,528
SELECTOR FOR TELEGRAPH PRINTER
Filed April 11, 1957  3 Sheets-Sheet 3
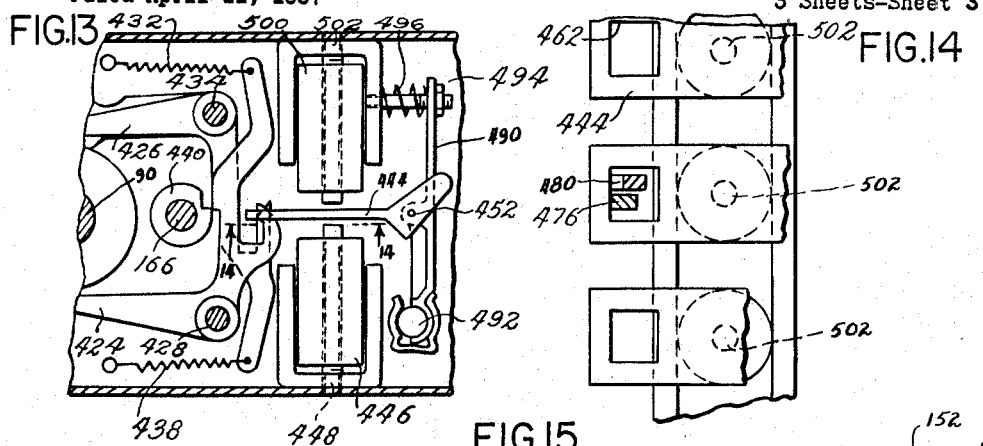
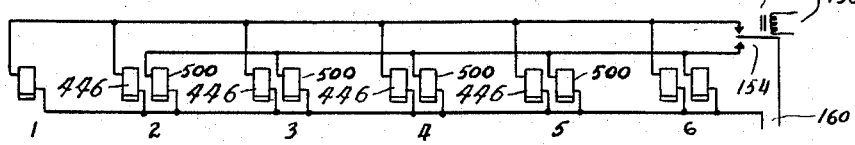
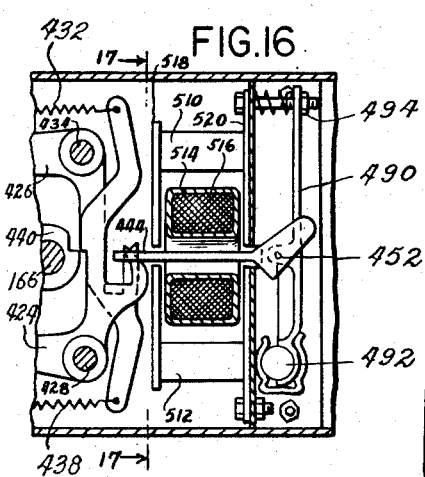
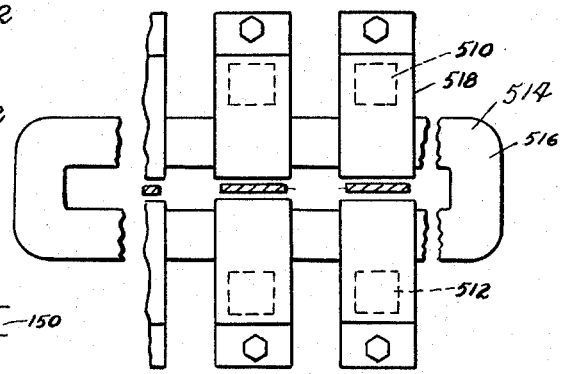
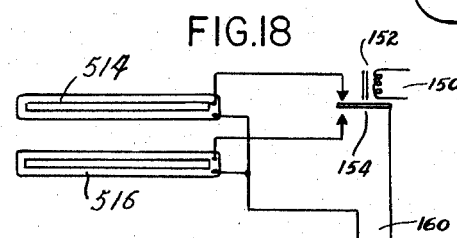
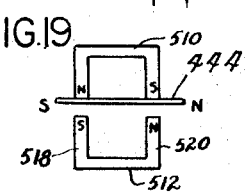
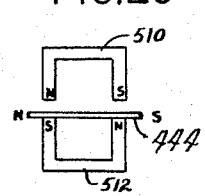
INVENTOR.
BERNARD HOWARD
BY
ATTORNEYS

United States Patent Office 2,918,528
Patented Dec. 22, 1959

2,918,528

SELECTOR FOR TELEGRAPH PRINTER

Bernard Howard, Ramsey, N.J., assignor to Teleprinter Corporation, Hackensack, N.J., a corporation of New Jersey Application April 11, 1957, Serial No. 652,179

15 Claims. (Cl. 178—34)

This invention relates to a telegraphic printer, and more particularly to selector mechanism therefor.

The primary object of the present invention is to generally improve the telegraph printer disclosed in my Patent 2,769,029, granted October 30, 1956. In that patent, I disclose a telegraph printer utilizing type on a cylinder arranged for both axial and rotative movement, by means of two cables each acted on by pulleys which appropriately shorten or lengthen the cables. The pulleys are mounted on levers which are moved by cams on a main cam shaft. The shaft turns continuously, but the cams are turned thru individual half-revolution clutches, thus providing either an "in" position or an "out" position for the corresponding lever and pulley. The clutches are controlled by stops which are themselves controlled by magnets. In my aforesaid patent, the stops are urged by resilient means to release position, but are held in stop position by the direct pull of electromagnets.

One object of the present invention is to minimize the necessary electrical power for control of the selector. Another object is to increase the speed of operation of the printer. Another is to prevent simultaneous release of both clutch stops. With these objects in view, the stops are controlled by a light-weight latch which has only a slight movement, and the magnets with their associated circuitry control the latch. A further object is to keep the latch free of the stops when the latch is moved, so that its motion is substantially frictionless.

To accomplish the foregoing general objects, and other more specific objects which will hereinafter appear, my invention resides in the selector elements and their relation one to another as are more particularly described in the following specification. The specification is accompanied by drawings in which:

Fig. 1 corresponds substantially to Fig. 1 of my Patent No. 2,769,029, and shows one example of telegraphic printer to which the present improvements are applied;

Fig. 2 is a section taken approximately in the plane of line 2—2 of Fig. 1, and shows a form of my invention using a single magnet for each of the latches;

Fig. 3 is an enlarged fragmentary view showing the relation of the latch to one of the clutch stops.

Fig. 4 is a fragmentary view showing the relation of the latch to the other clutch stop.

Fig. 5 shows the configuration of the latches.

Fig. 6 is an edge view of the stop lever shown in Fig. 4;

Fig. 7 is an edge view of the stop lever shown in Fig. 3;

Fig. 8 is a wiring diagram closely related to Fig. 22 of my Patent 2,769,029, but showing the circuit used herein;

Figs. 9 through 12 are fragmentary views explanatory of a detail of the invention.

Fig. 13 is a section generally similar to Fig. 2, but showing a modification in which the latch is moved by opposed magnets, and in which the printer is turned bodily to a generally horizontal position;

Fig. 14 is a view taken approximately in the plane of the line 14—14 of Fig. 13;

Fig. 15 is a wiring diagram, much like Fig. 22 in my Patent 2,769,029, but applicable to the modification shown in Fig. 13;

Fig. 16 is another fragmentary section generally similar to Fig. 13, but showing a further modification in which the latch is controlled by polarizing magnets and permanent magnets;

Fig. 17 is a fragmentary view taken approximately in the plane of the line 17—17 of Fig. 16;

Fig. 18 is a wiring diagram applicable to the modification of Fig. 16; and

Figs. 19 and 20 are explanatory of the polarized operation of the modification shown in Fig. 16.

Figure 1:
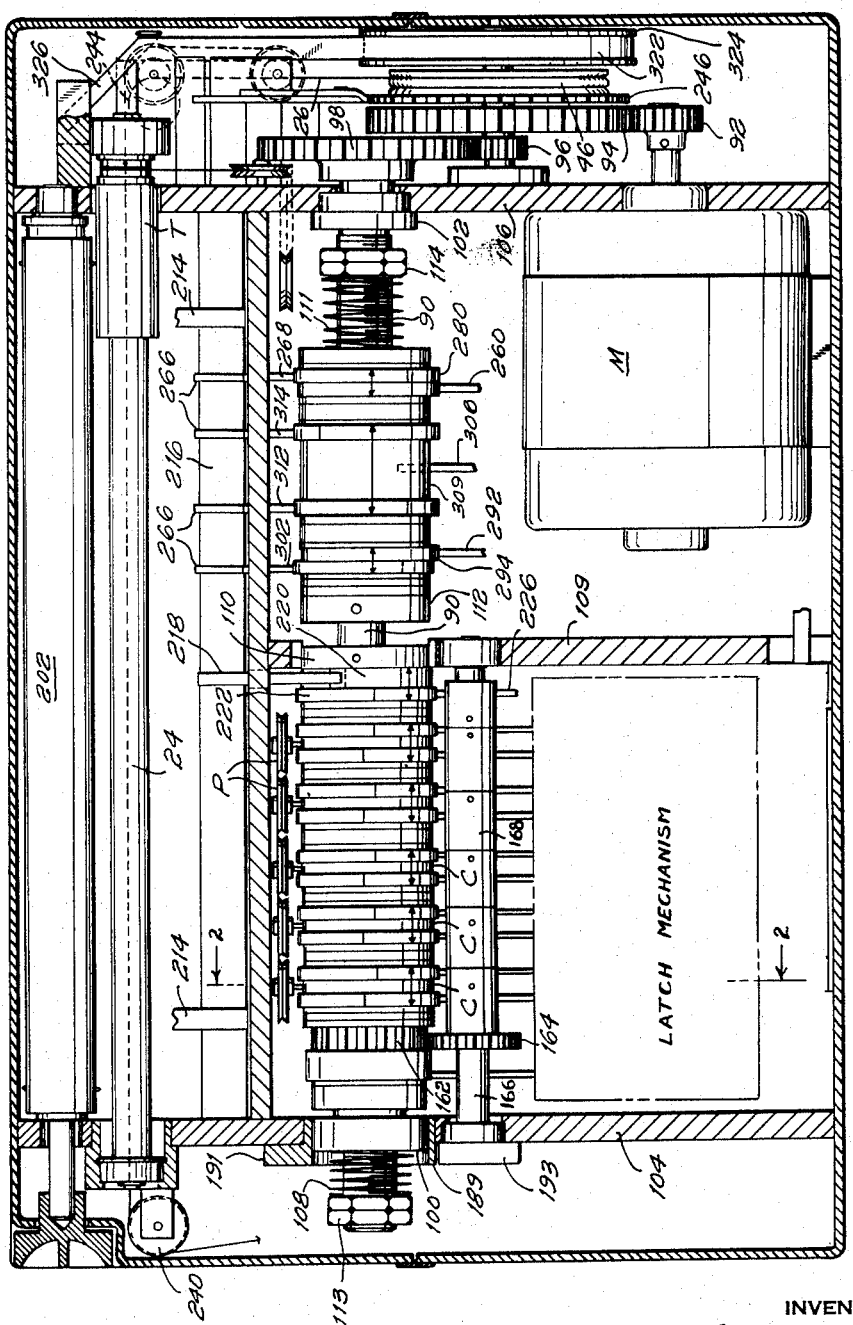

Referring to the drawing, and more particularly to Fig. 1, the telegraphic printer there shown corresponds generally to that disclosed and described in detail in my Patent No. 2,769,029. The type cylinder is shown at T, and is movable axially by means of a cable, shown in dotted lines within hollow shaft 24. It is also movable rotatably because it is slidably keyed on said shaft 24, which is turned by means of another cable shown at the right end of the shaft. The paper passes around a paper roll 202. The selection of type is determined by lengthening or shortening of the two cables, which in turn depends on movement of a series of pulleys P between "in" and "out" positions. The pulleys are disposed at the ends of cam follower levers, which are moved by a series of cams C carried on a main cam shaft 90. Alternate pulley levers are in front of the cams, but these have been omitted to simplify the drawing. The cam shaft is continuously driven by a synchronous motor M through a gear train including pinion 92 meshing with gear 94 which turns pinion 96 meshing with gear 98 mounted on cam shaft 90. The cams are normally stationary, but at intervals are permitted movement by release of half-revolution clutches immediately adjacent their respective cams on shaft 90.

Referring now to Fig. 2, pulley 412 is carried at the upper end of cam follower lever 414, the cam follower portion 416 of which bears against a cam 418. The lever is moved between an "in" position shown in solid lines, and an "out" position shown at 414' in broken lines. The half rotation of cam 414 is controlled by a clutch 420 having a stop tooth 422 which engages stops 424 and 426. The clutch action may be a simple frictional drive, or in more refined form, it may utilize improved friction roller clutches, including also anti-chatter back-stops, as disclosed in detail in my copending application Ser. No. 637,184, filed January 30, 1957, and entitled "Multiple Clutch." The push stop 424 is pivoted at 428, and forms part of an angle lever, the other end 430 of which is pulled by a spring 432. The hook stop 426 is pivoted at 434, and forms part of an angle lever, the other arm 436 of which is pulled by a spring 438. Thus, the stops are normally urged toward a sequence cam 440 mounted on a sequence cam shaft 166 which normally prevents release of the stops until a desired time, indicated by the cam drop 442.

Attention is directed to the pulley 413 shown in phantom lines. This is carried at the end of a pulley lever 415, and it will be understood that the latter if shown more completely, would have a cam follower portion, and would cooperate with a cam, much as in the case of lever 414. The cable extends back and forth between successive pulleys, and the motion of each pulley working on a single cable differs from that of another pulley, one motion being double the next. The net effect is that each cable may be shortened or lengthened in varying amounts, depending on the combinations of pulley movement. This is all explained in detail in my Patent 2,769,029 aforesaid.

Reverting to Fig. 1, the main cam shaft 90 drives a gear 162 meshing with a gear 164 carried by a sequence shaft 166, and thus the latter is continuously driven by the motor M. If the sequence shaft is driven in one-to-one ratio with the cam shaft, the sequence cam corresponding to cam 440 in Fig. 2 will have two diametrically opposite drops, but by driving the sequence shaft in two-to-one ratio, the sequence cams may have a single drop as shown in Fig. 2.

In accordance with the present invention, a latch 444 cooperates with the stops 424 and 426. A magnetic means 446 and its associated circuitry controls the position of the latch 444. In Fig. 2, the latch is shown in mid position, but in practice it never remains in this position, and instead remains at one side or the other. Its motion is slight, and is determined by motion limiting stops in the form of adjustable screws 448 and 450. For convenience, the stop 448 passes through and acts as a part of the core of magnet 446.

With the latch in a position against the stop 448, it holds the arm 436 and clutch stop 426, and releases the arm 430 and clutch stop 424, and with the latch in its opposite position against the stop screw 450, it holds the arm 430 and its clutch stop 424 and releases the arm 436 and its clutch stop 426.

Of course, for actual release of either clutch stop, the sequence cam 440 must also be in proper position, coincidentally with the operation of the latch 444. The cam would release both stops, but only one stop or the other is released by the latch, which is as it should be to insure only one-half revolution of the cam.

In the present case the latch is in the form of a flipper which is pivoted at 452, and has an extension 454 which is pulled to the left by means of a spring 456. Thus, the latch is urged against stop 450 when magnet 446 is de-energized, and is pulled against stop 448 when magnet 446 is energized.

The preferred construction of the latch mechanism may be explained as follows. Referring to Fig. 9, one stop might have a detent 458, and the other a detent 460, these being controlled by a flipper or latch 444. Referring momentarily to Fig. 5, the latch 444 may be stamped out of sheet material, and provided with a rectangular opening or window 462. This provides a latch which is strong even though light in weight.

Reverting to Fig. 9, it will be evident that with the latch moved to the left, the detent 458 will be held, while detent 460 is released, and vice versa. A disadvantage of this arrangement is that in mid position, during transition of the latch from one side to the other, there is an instant during which both stops might be released. This is tolerable, because the sequence cam preferably does not come into release position until an instant later, but nevertheless, in the interests of caution, and for very high speed operation, it is desirable to prevent even the possibility of simultaneous release of both stops.

Referring now to Fig. 10, the latch 464 differs in having a T-shaped top 466. This is large enough to hold both stops when the latch is in mid position, but is small enough to release one stop or the other when the latch has moved to one side or the other. This construction increases the cost of the latch, because it cannot be stamped out of sheet material.

Referring now to Fig. 11, the same object may be accomplished by lengthening the detents 468 and 470, so that they slightly overlap. In such case, the latch 444 will hold both when in mid position. Actually, because the latch has some thickness, it is not essential that the stops actually overlap, and if they come as far as one another, they will be held because of the thickness of the latch.

The arrangement of Fig. 11 is satisfactory, but makes the mechanism difficult to assemble and service, in that the latch is held permanently anchored on the stops, and it is therefore advantageous to direct both detents from one side, as shown in Fig. 12, in which the detent 472 comes from one of the clutch stops, while the reversely directed detent 474 comes from the other clutch stop. With this arrangement, the windowed latch 444 is readily moved into or out of position during assembly or servicing of the apparatus.

The actual shape of the parts is better shown in Figs. 3 and 4 of the drawing. In Fig. 3, the stop 426 is pivoted at 434, and has a reversely directed detent 476 which cooperates with latch 444. This figure also shows the cam follower part 478 of the clutch stop lever. In Fig. 4, the stop 424 is pivoted at 428, and it has a detent 480 cooperating with the latch 444. There is also a cam follower part 482. The angle levers are disposed alongside one another, and are controlled by a single latch. The clutch stop levers are also shown in Figs. 6 and 7, and are provided with suitable hubs 484 and 486, which hold them in desired position.

From inspection of Fig. 1, it will be recalled that there is a series of cams and clutches. Referring to Fig. 5, there is a series of latches, one for each clutch, only three of which are shown in the drawing, and similarly, a series of electromagnets like 446 in Fig. 2, one for each latch. The circuitry is quite simple, because all of the magnets are simultaneously energized or de-energized, as will be seen from inspection of Fig. 8, in which the incoming telegraph line (or radio channel output) is connected at 150, and controls a relay coil 152 which operates a relay contact 154. This controls a local source of current supplied at 160, and all of the magnets 446, also marked 1, 2, 3, 4, 5 and 6, are simultaneously energized or de-energized.

The present selector is intended to respond to a five level code, that is, five pulses (exclusive of synchronizing control) are available for selection of each character to be printed. The term "pulse" is used for convenience, although in practice it is customary to have continuous energization of the telegraph line so as to more readily detect a failure or breakage of the line. In any event, during each interval or time period, the line current is either "on" or "off," and the term "pulse" refers simply to one of these conditions for one of the time intervals.

Although the magnets are all energized or de-energized simultaneously, the response at the clutches and cams is limited to that clutch and cam which is to be controlled by one particular pulse in the series, and this distribution of the pulse response is taken care of by the sequence cams, one of which is shown at 440 in Fig. 2. There are sequence cams for all of the clutches, and they are rotatably displaced from one another, so that the clutches can operate solely in desired sequence. The rest of the time the stop levers are held in stop position by the generally circular periphery of the sequence cams.

In passing, it may be mentioned that the radius of the sequence cams is such that the latch 444 is free to move without load or friction at the stop levers. Specifically, in Fig. 3 there is normally a slight clearance between the detent 476 and the latch 444, and similarly, in Fig. 4, there is normally a slight clearance between the detent 480 and the latch 444. Thus, the latch is readily shifted to either extreme position.

To adjust the exact desired clearance for free movement of the latch, it is convenient to make the position of the latch adjustable, that is, the height of the latch when it is vertical as shown in Fig. 2. For this purpose, the pivot 452 is mounted on a support arm 490, which is pivoted at 492, and held at its other end by a nut 494. The arm 490 is urged downward by a compression spring 496 surrounding the screw 498. It will be evident that by adjustment of nut 494, the height of pivot 452 may be varied slightly, and this in turn adjusts the clearance between the stop levers and the latch. A lock nut may be used against nut 494, or an elastic stop nut may be used to be self-locking.

A modified form of the invention is shown in Figs.

13, 14 and 15 of the drawing. Fig. 13 is a section generally similar to Fig. 2, but with two differences. One is that the printer structure has been turned bodily and is used in horizontal instead of vertical position. This change is shown and explained in my copending application Ser. No. 596,294, filed July 6, 1956, and entitled "Telegraphic Printing Apparatus." In brief, the horizontal arrangement proves more convenient and compact when the printer (receiver) is associated with a transmitter (keyboard). The other change is that in Fig. 13, the movement of the latch is obtained magnetically in both directions.

Referring to Fig. 13, the cam shaft 90, sequence shaft 166, push stop 424, hook stop 426, pull springs 432 and 438, and sequence cam 440, all correspond to the similarly numbered parts shown in Fig. 2. The latch 444 may be like that previously described, and is similarly pivoted at 452 on a mount arm 490 which is itself pivoted at 492, and arranged for adjustment by means of a nut 494. The magnet coil 446 corresponds to that previously shown, and may similarly be provided with an adjustable stop screw 448 forming a part of the magnet core.

However, another electromagnet is provided for movement of latch 444 in the opposite direction. The arrangement may be symmetrical, with an opposed magnet coil 500 and an adjustable stop screw 502.

Fig. 14 shows the latches 444 with rectangular openings or windows 462, as previously described, and these cooperate with stop levers as shown at 476 and 480.

The electrical circuit is shown in Fig. 15, and again comprises a relay coil 152 energized from the line 150 and controlling a relay contact 154, which engages either an up contact or a down contact. When it engages the up contact the magnets 446, or left hand magnets are energized. When the relay closes to the down contact, the magnets 500 or right hand magnets are energized. Thus, the latches are moved to one position or the other, with an appropriate response solely at that clutch which is released by the sequence cam.

The use of opposed magnets, as in Fig. 13, instead of one magnet and spring, as in Fig. 2, has the advantage of compensating for change in local battery voltage. When a spring is used, it may be adjusted for either full voltage on the magnet, or reduced voltage. If adjusted for reduced voltage, the operating speed of the printer must be kept lower than it could be when full voltage is available. If the spring tension is adjusted for full voltage, then in the event of reduced voltage, the magnet will be inadequate to pull the latch against the spring. The double or symmetrical magnet arrangement avoids this problem. It has another advantage for military purposes in that if there is any detectable radiation, an enemy cannot read the signal from the radiation for it is continuous, whereas with a single magnet, it might. Similar remark applies to eavesdropping or wire tapping by means of a remote sensitive pickup, even in civilian life.

Still another modification of the invention is shown in Figs. 16 through 20 of the drawing. In this case, the operation is refined even further, the speed is increased, and the amount of electrical power needed to operate the latches is reduced, by polarizing the latches.

Referring first to Fig. 16, the sequence shaft 166 and sequence cam 440 correspond to those shown in Fig. 13. Similar remark applies to the clutch stop 424 pivoted at 428, and pulled by spring 432, and to the clutch stop 426 pivoted at 434 and pulled by the spring 438. Here again, the latch 444 is pivoted at 452 on a mounting arm 490, which is itself pivoted at 492, and adjustable by means of a nut 494.

In the present form of the invention, the latch 444 is disposed between permanent magnets 510 and 512, and these magnets are so polarized as to neutralize one another. This will be seen in Figs. 19 and 20, in which the north pole of magnet 510 is directly opposite the south pole of magnet 512, and vice versa. The latch 444 is made of ferrous material which is temporarily magnetizable, but has no (negligible) permanent magnetism. Thus without polarization the latch might rest neutrally between the magnets.

Reverting to Fig. 16, the latch 444 is surrounded by two polarizing coils 514 and 516, one or the other of which may be energized at a time. They are shown as one body in Fig. 16 because a bifilar winding preferably is used. Returning now to Fig. 19, when one coil is energized, the latch is polarized with a south pole at the one end, and a north pole at the other end, whereupon it is attracted by magnet 510, and repelled by magnet 512, as shown in Fig. 19. However, when the other coil is energized, the latch is polarized in reverse fashion, and it is attracted by the magnet 512, and repelled by magnet 510, as shown in Fig. 20.

The permanent magnets may be individual for each latch, and may include a straight bar magnet made of alnico or like material. This may be set between ferrous strips 518 and 520, which act as poles, and which come quite close to the latch. One such assembled permanent magnet is disposed on each side of each of the latches.

The polarizing coil could be individual for each latch, as with the permanent magnets, but inasmuch as they are energized simultaneously, the coil structure may be simplified to provide one elongated coil 514, 516 for all of the latches. The coils of elongated shape are clearly shown in Figs. 17 and 18, and in this case enclose six latches.

The significance of the schematic diagram in Fig. 18 will be understood from the previous descriptions. The incoming line 150 energizes a relay coil 152 which controls a relay contact 154. When this closes to the upper contact, the coil 514 is energized from the local source 160, and when the relay closes to the lower contact, it is the coil 516 which is energized from the local source 160.

In Fig. 18 the coils 514 and 516 have been shown separately, for clarity, but it will be understood that in actual practice, a single coil structure may be wound with a bifilar winding, terminating in four leads. These are connected as shown in Fig. 18, and the result is as though two separate coil structures were used, except that the field distribution pattern is made more uniform (although reversed in direction).

The polarized arrangement of Fig. 16 is fast acting because only a minimum mass of ferrous metal needs to be magnetized. There is a saving in mass and a reduction in inertia not only in a mechanical sense, but also in the electrical or magnetic sense. The response time can be reduced to only a fraction of what is needed with a direct magnetic pull.

In Figs. 15 and 18, the movable contact of the relay is shown in mid-position, but in practice it never remains in that position, and instead is always closed to either the upper contact or the lower contact. Similarly, in Figs. 2, 13 and 16, the latch is shown in mid-position, but it will be understood that in practice, it never remains in that position, and instead is always shifted to either one side or the other.

It is believed that the construction and operation, as well as the advantages of my improved selector, will be apparent from the foregoing detailed description. The electrical circuitry controls a latch for the stop levers, instead of acting directly on the stop levers themselves. Inasmuch as the latch may be made small in mass, and slight in movement, it is readily controlled by only a small fraction (say one twentieth) of the electrical power previously required, and the resulting operation of the printer is much faster than previously attainable. Another advantage of the present arrangement is that it is not possible for both clutch stops to release at the same time.

It will also be apparent that while I have shown and described my invention in several preferred forms, changes may be made in the structures shown, without departing from the scope of the invention, as sought to be defined in the following claims.

I claim:

1. In a telegraph printer, a main shaft having a clutch driving a main cam, a stop to arrest movement of the main cam, a sequence cam to normally prevent release of said stop until a desired time, resilient means urging said stop toward said sequence cam in an effort to release said stop, a latch cooperating with said stop and movable to mechanically catch or release the stop, and magnetic means and associated circuitry to control the position of said latch, said latch in one position mechanically holding the stop and said latch in its other position releasing the stop.

2. In a telegraph printer, a main shaft having a clutch driving a main cam, first and second stops to arrest movement of the main cam at half revolution intervals, a sequence cam to normally prevent release of said stops until a desired time, resilient means urging said stops toward said sequence cam in an effort to release said stops, a latch cooperating with said stops and movable to mechanically catch or release the stops, magnetic means and associated circuitry to control the position of said latch, said latch in one position mechanically holding the first stop and releasing the second, and said latch in its other position mechanically holding the second stop and releasing the first.

3. In a telegraph printer, a main shaft having a main clutch driving a main cam, first and second stops to arrest movement of the cam at half revolution intervals, one of said stops being a pusher forming part of an angle lever, and the other being a hook forming a part of an angle lever, with the pusher and hook located on opposite sides of the clutch, and the angle portions of said levers extending toward one another to act as cam followers cooperating with a sequence cam which normally prevents release of said stops until a desired time, resilient means urging said followers toward said sequence cam to release said stops, a latch cooperating with said stops and movable to mechanically catch or release the stops, magnetic means and associated circuitry to control the position of said latch, said latch in one position mechanically holding the first stop and releasing the second, and said latch in its second position mechanically holding the second stop and releasing the first.

4. In a telegraph printer, a main shaft having a series of clutches each driving a main cam, a stop associated with each clutch and main cam to arrest movement of the cam, a sequence cam shaft carrying a plurality of sequence cams, one for each clutch and main cam, to normally prevent release of the stops until a desired time, said sequence cams being displaced rotationally to distribute the action of the clutches and cams to correspond to incoming pulses making up the signal, resilient means urging said stops toward said sequence cams to release said stops, latch means cooperating with the stops and movable to mechanically catch or release the stops, magnetic means and associated circuitry to control the position of said latch means, said latch means in one position mechanically holding the stops, and said latch means in the second position releasing the stops.

5. In a telegraph printer, a main shaft having a series of clutches each driving a main cam, first and second stops associated with each clutch and main cam to arrest movement of the cam at half revolution intervals, a sequence cam shaft carrying a plurality of sequence cams, one for each clutch and main cam, to normally prevent release of the stops until a desired time, said sequence cams being displaced rotationally to distribute the action of the clutches and cams to correspond to incoming pulses making up the signal, resilient means urging said stops toward said sequence cams to release said stops, a latch means cooperating with the stops and movable to mechanically catch or release the stops, magnetic means and associated circuitry to control the position of said latch means, said latch means in one position mechanically holding the first stops and releasing the second, and said latch means in the second position mechanically holding the second stops and releasing the first.

6. The combination defined in claim 2 in which there are first and second adjustable stops to limit the motion of the latch, and resilient means normally urging the latch in one direction against one of the stops, and in which the magnetic means urges the latch in opposite direction away from said first stop and toward the second stop.

7. The combination defined in claim 5 in which there are first and second adjustable stops to limit the motion of the latch means, and resilient means normally urging the latch means in one direction against one of the stops, and in which the magnetic means urges the latch means in opposite direction away from said first stop and toward the second stop.

8. The combination defined in claim 2 in which there are first and second adjustable stops to limit the motion of the latch, and in which there is a first magnetic means to pull the latch against one of the stops, and a second magnetic means to pull the latch against the second stop, and in which said circuitry is arranged to energize one magnetic means or the other.

9. The combination defined in claim 5 in which there are first and second adjustable stops to limit the motion of the latch means, and in which there are first magnetic means to pull the latch means against the first stop, and second magnetic means to pull the latch means against the second stop, and in which said circuitry is arranged to energize either the first magnetic means or the second magnetic means.

10. The combination defined in claim 1 in which the latch means is disposed between permanent magnets which are so polarized as to neutralize one another, and in which a pair of polarizing magnet coils surround the latch means to polarize the same, and in which the circuitry is so arranged as to energize one polarizing coil or the other, thereby polarizing the latch means in one polarity or the other, so that it is attracted by one side and repelled by the other, whereby it is pulled to one side or the other by the permanent magnets.

11. The combination defined in claim 2 in which the latch means is disposed between permanent magnets which are so polarized as to neutralize one another, and in which a pair of polarizing magnet coils surround the latch means to polarize the same, and in which the circuitry is so arranged as to energize one polarizing coil or the other, thereby polarizing the latch means in one polarity or the other, so that it is attracted by one side and repelled by the other, whereby it is pulled to one side or the other by the permanent magnets.

12. The combination defined in claim 4 in which the latch means are disposed between permanent magnets which are so polarized as to neutralize one another, and in which a pair of polarizing magnet coils surround the latch means to polarize the same, and in which the circuitry is so arranged as to energize one polarizing magnet coil or the other, thereby polarizing the latch means in one polarity or the other, so that they are attracted by one side and repelled by the other, whereby they are pulled to one side or the other by the permanent magnets, and in which the polarizing coils are so elongated in configuration as to enclose the entire row of latch means.

13. The combination defined in claim 5 in which the latch means are disposed between permanent magnets which are so polarized as to neutralize one another, and in which a pair of polarizing magnet coils surround the latch means to polarize the same, and in which the circuitry is so arranged as to energize one polarizing magnet coil or the other, thereby polarizing the latch means in one polarity or the other, so that they are attracted by one side and repelled by the other, whereby they are pulled to one side or the other by the permanent magnets, and in which the polarizing coils are so elongated in configuration as to enclose the entire row of latch means.

14. In a telegraph printer, a main shaft having a clutch driving a main cam, first and second stops to arrest movement of the main cam at half revolution intervals, resilient means urging said stops in a direction to release said stops, a light-weight latch cooperating with said stops and movable to mechanically catch or release the stops, magnetic means and associated circuitry to control the position of said latch, said latch in one position mechanically holding the first stop and releasing the second, and said latch in its other position mechanically holding the second stop and releasing the first.

15. In a telegraph printer, a main shaft having a main clutch driving a main cam, first and second stops to arrest movement of the cam at half revolution intervals, one of said stops being a pusher forming part of an angle lever, and the other being a hook forming a part of an angle lever, with the pusher and hook located on opposite sides of the clutch, and the angle portions of said levers extending toward one another to act as cam followers cooperating with a sequence cam which normally prevents release of said stops until a desired time, resilient means urging said followers toward said sequence cam to release said stops, a light-weight pivoted latch cooperating with said stops and movable to mechanically catch or release the stops, said main cam and sequence cam and latch and latch pivot being alined in a direction generally perpendicular to the angle portions of said levers, magnetic means and associated circuitry to control the position of said latch, said latch in one position mechanically holding the first stop and releasing the second, and said latch in its second position mechanically holding the second stop and releasing the first.

References Cited in the file of this patent

UNITED STATES PATENTS

| | | |
|---|---|---|
| 2,327,176 | Cory | Aug. 17, 1943 |
| 2,769,029 | Howard | Oct. 30, 1956 |